United States Patent [19]
Schultz et al.

[11] 3,780,785
[45] Dec. 25, 1973

[54] BEAD BREAKER AND TIRE REMOVAL AND REPLACEMENT DEVICE

[76] Inventors: Matthew Schultz, Box 241; William L. Schultz, Box 485, both of Red Lake Falls, Minn.

[22] Filed: Sept. 27, 1971

[21] Appl. No.: 184,101

[52] U.S. Cl. .............................. 157/1.24, 157/1.28
[51] Int. Cl. .......................................... B60c 25/06
[58] Field of Search................ 157/1.17, 1.22, 1.24, 157/1.26, 1.28, 1.3

[56] References Cited
UNITED STATES PATENTS

| | | | |
|---|---|---|---|
| 3,032,095 | 5/1962 | Brosene, Jr. et al. | 157/1.28 |
| 3,042,090 | 7/1962 | Foster | 157/1.28 X |
| 3,522,832 | 8/1970 | Held | 157/1.22 |

*Primary Examiner*—Granville Y. Custer, Jr.
*Attorney*—Andrew E. Taylor

[57] ABSTRACT

The wheel and tire are mounted for selective rotation horizontally and an upper bead breaking component is hydraulically controlled to swing into position and descend to break the top bead. A lower plate type bead breaker is hydraulically actuated to move upwardly to move the lower bead. The table is then rotated and a tire removal tool engaged upon the central standard for removing the tire from the rim. The same tool is reversed to install the tire on the rim.

34 Claims, 19 Drawing Figures

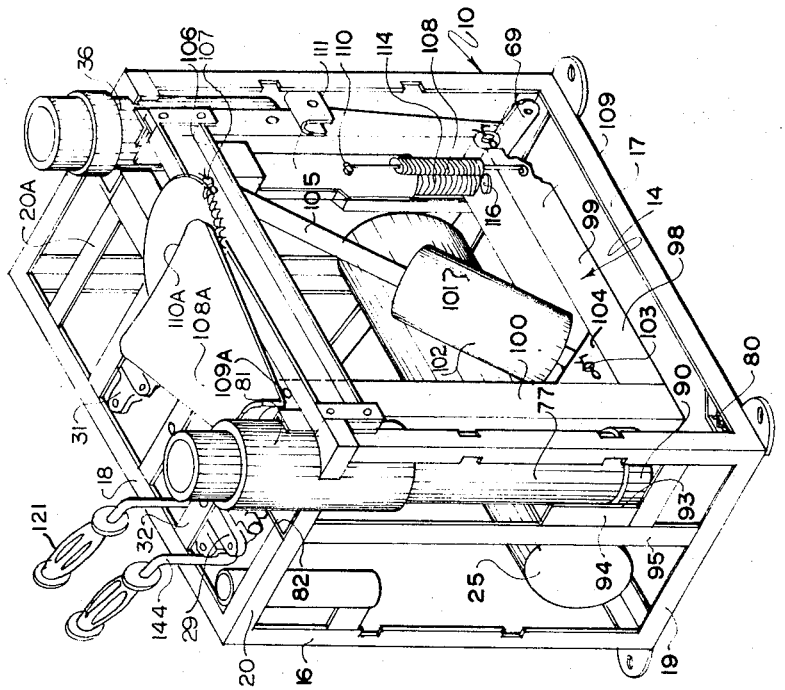
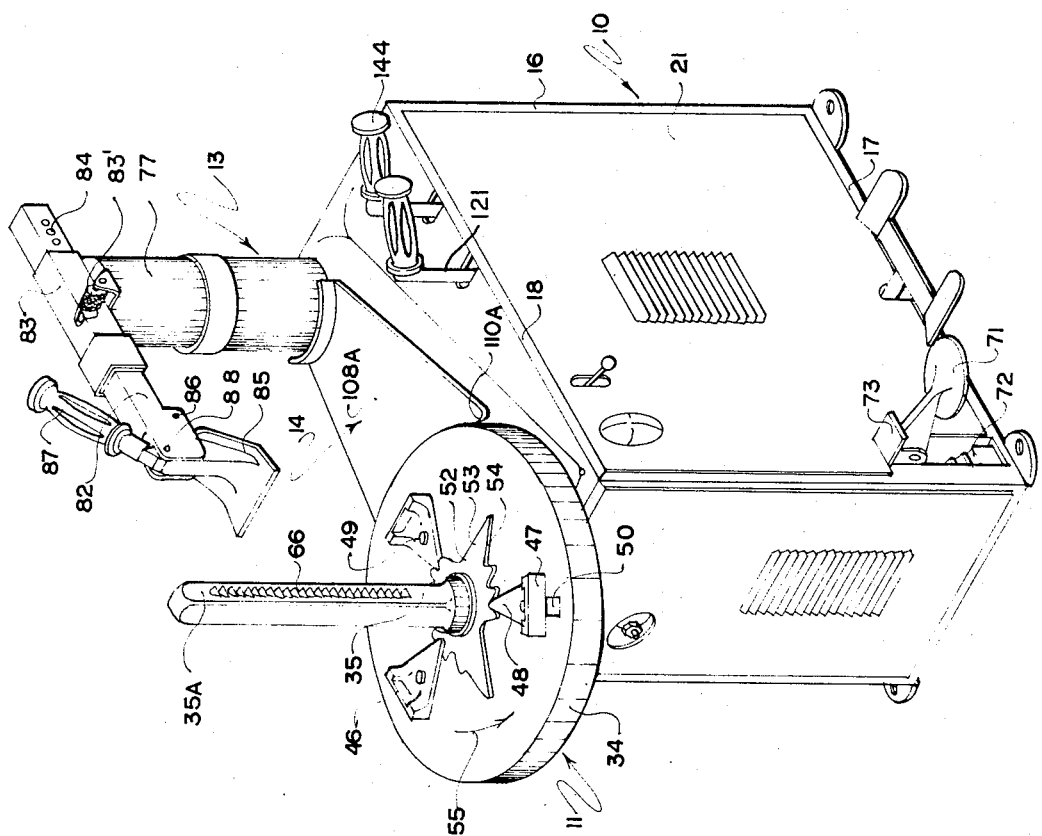

PATENTED DEC 25 1973 3,780,785

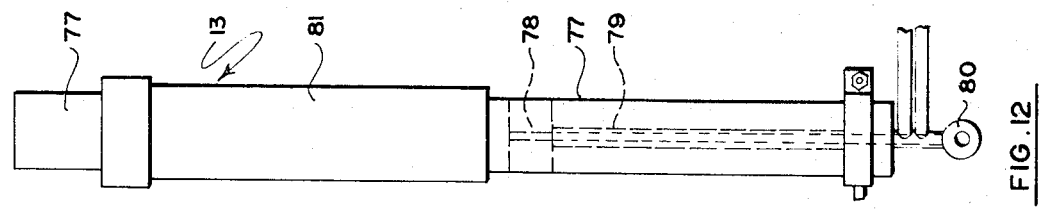
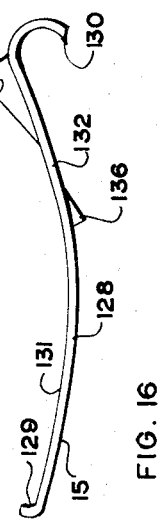
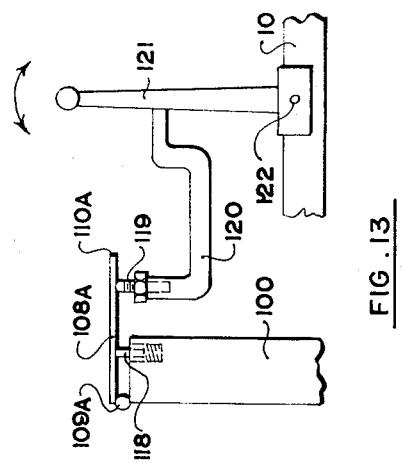
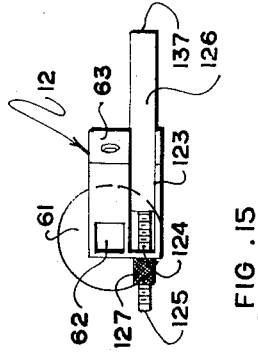
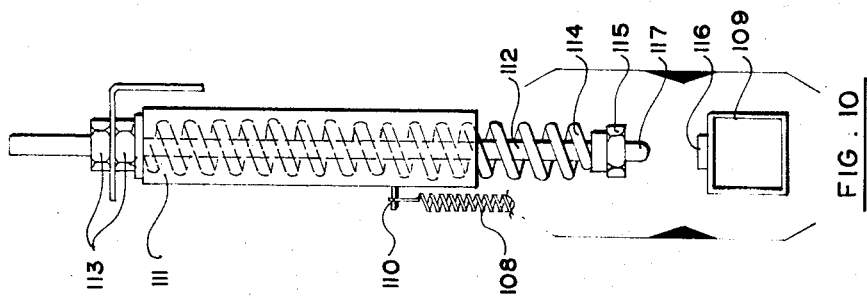
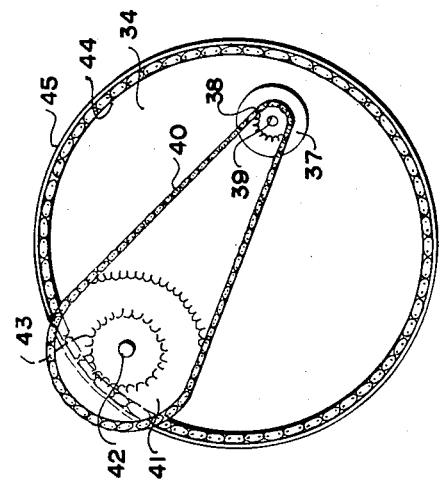
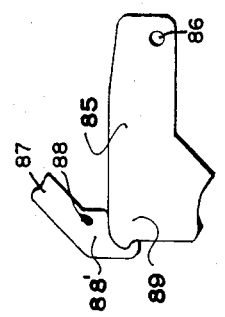
FIG. 12
FIG. 13
FIG. 15
FIG. 16
FIG. 10
FIG. 9
FIG. 11

BEAD BREAKER AND TIRE REMOVAL AND REPLACEMENT DEVICE

BACKGROUND OF THE INVENTION

There are many bead breaking and tire removal devices on the market all of which are extremely cumbersome and often incorporate two separate machines on a common frame. Such machines do not readily incorporate means for adjustment to varying sizes of wheels and the majority of conventional machines damage so called "mag" wheels due to the material used in the manufacture of said wheels. With the advent of relatively wide and large tires, particularly for passenger cars, conventional bead breaking devices are inadequate.

SUMMARY OF THE INVENTION

The present invention overcomes all of the disadvantages of conventional equipment by providing a combination bead breaker and tire removal device operated from a common hydraulic source which is powerful enough to undertake all operations required upon the majority of tires and wheels which can be fitted to the device.

Another object of the invention is to provide a device of the character herewithin described in which the table is adjustable so that varying wheel sizes can be accommodated. Furthermore the upper and lower bead breakers are also adjustable so that they may be used on a wide variety of tires and wheels.

Another object of the invention is to provide a device of the character herewithin described which incorporates means to permit use on "mag" wheels without damaging same.

A still further object of the invention is to provide a device of the character herewithin described in which the upper bead breaker includes means to swing same out of the way and into position during the sequence of operation.

A yet further object of the invention is to provide a device of the character herewithin described in which the lower bead breaking device moves upwardly to clear the table and then inwardly to engage between the bead and the rim and then upwardly and inwardly alternatively until the bead is broken.

A still further object of the invention is to provide a device of the character herewithin described which includes means to prevent damage occurring in the event that the upper bead breaker fails to engage between the tire and rim properly.

Still another object of the invention is to provide a device of the character herewithin described which includes means adapted to be engaged by a tire removal and replacement tool for removing and replacing the tire respectively.

A still further object of the invention is to provide a device of the character herewithin described which is extremely compact, simple in construction, economical in manufacture, and otherwise well suited to the purpose for which it is designed.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept.

DESCRIPTION OF DRAWINGS

FIG. 1 is an isometric view of the device with the tire holding cone removed.

FIG. 2 is an isometric view of the device with the cover panels removed, the table and standard removed, and the upper bead breaker component removed for clarity.

FIG. 9 is an underside view of the table and drive means.

FIG. 10 is a side elevation of the spring assembly for the lower bead breaking actuating component.

FIG. 11 is a fragmentary side elevation showing the engagement of the upper bead breaking handle with the bead breaking spoon.

FIG. 12 is a side elevation of the upper bead breaking piston and cylinder assembly per se.

FIG. 13 is a side elevation, partly schematic, showing the automatic cut-off of the lower bead breaking component.

FIG. 15 is a top plan view of FIG. 14.

FIG. 16 is a side view of a combination tire removal and replacement tool.

In the drawings like characters of reference indicate corresponding parts in the different figures.

PRELIMINARY DESCRIPTION

Figure 3:
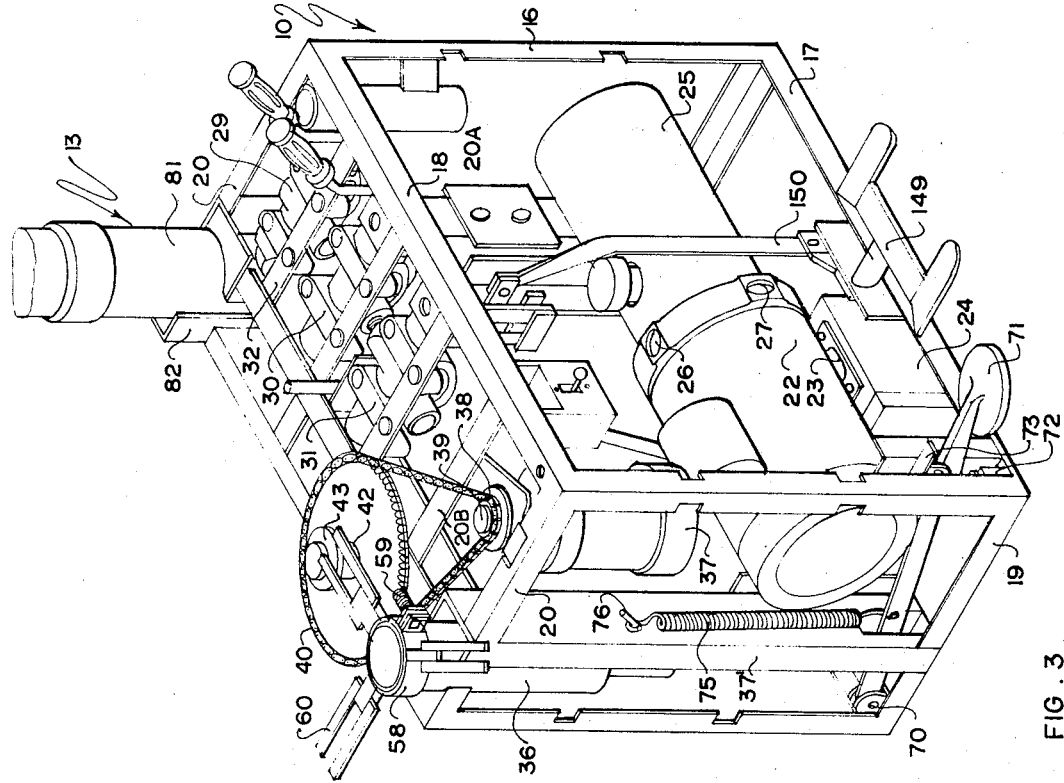
FIG. 3 is an isometric view similar to FIG. 2 but taken from the opposite side, with the lower bead breaker removed and part of the table assembly and drive shown.

The device generally includes supporting framework collectively designated 10, a wheel supporting component collectively designated 11, means to detachably secure the associated wheel and tire to the component 11, collectively designated 12, and upper bead breaking component collectively designated 13, a lower bead breaking component collectively designated 14, and a tire removal and replacement tool 15 engageable within the component 12 for removing and replacing the tire from the wheel.

DETAILED DESCRIPTION

Proceeding therefore to describe the invention in detail, reference should first be made to FIGS. 1, 2 and 3 in which the supporting framework 10 consists generally of vertical members 16, lower horizontal members 17 and upper horizontal members 18, the lower members 17 being joined by lower horizontal cross members 19 and the upper members 18 being joined by upper horizontal cross members 20 all of which forms a substantially cubical open framework which, when assembled, may be covered with cover panels 21 as shown in FIG. 1.

Situated within the framework 10 is a source of hydraulic fluid pressure taking the form of a combination electric motor and hydraulic pump 22 mounted upon a base 23 which in turn is supported upon the supporting member 24 mounted within the framework. A reservoir 25 is connected to the hydraulic pump and various outlets 26, 27 and 28 are provided around the periphery of the casing as shown in FIGS. 3 and 17.

Figure 17:
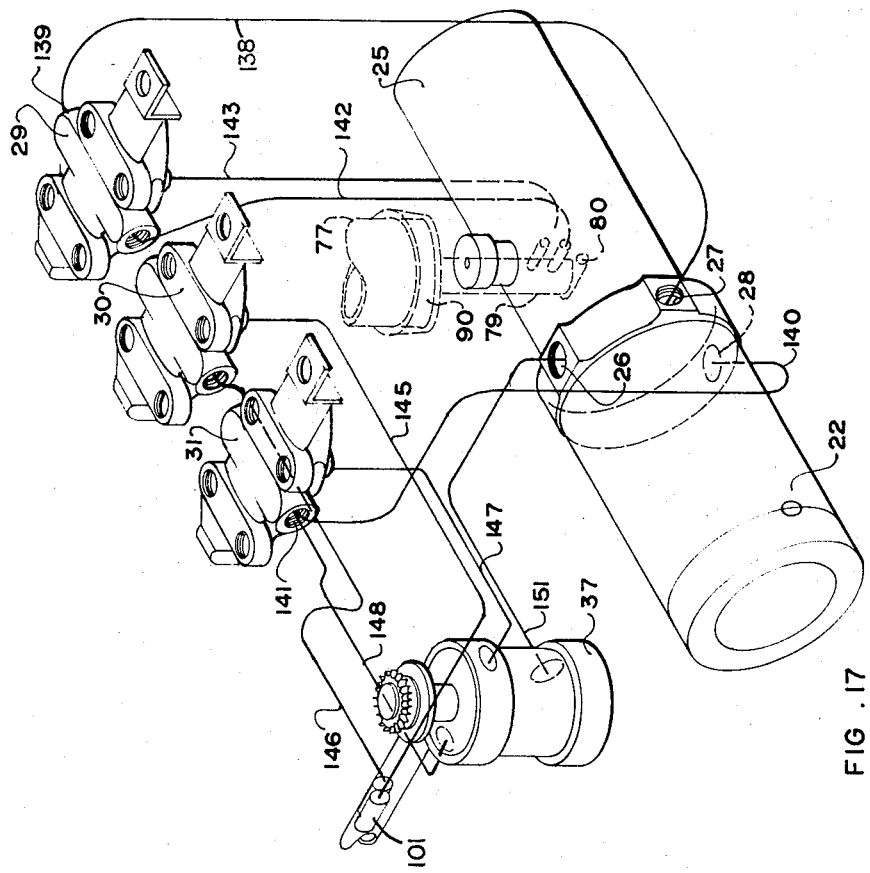
FIG. 17 is an isometric, partially schematic view showing the hydraulic connections.

Control shuttle valve assemblies 29, 30 and 31 are supported upon cross straps 32 adjacent the upper side of the supporting framework and these shown in FIGS. 3 and 17 also. The various connections between these shuttle valves and the hydraulic system and the components operated thereby will be described later on in the specification.

The wheel supporting component collectively designated 11 is adapted to support an associated tire and wheel 33 (shown in FIG. 14) and consists of a cylindrical table 34 journalled for rotation upon a non-rotatable standard 35. This standard 35 is in turn supported for limited vertical movement within a fixed cylindrical sleeve 36 supported vertically within one corner of the supporting framework, by means of a vertically situated channel member 37' extending between upper and lower cross members 20 and 19 of the framework (see FIG. 3). The upper and lower ends 35A and 35B respectively of the standard, are of square cross section with the portion in between, engaging the sleeve 36, being cylindrical.

Means are provided to rotate the table in either direction from the source of hydraulic pressure, said means taking the form of an hydraulic motor 37 supported by the upper end thereof between one of the cross members 20 and a parallel cross member 20A (see FIG. 3). A sprocket 38 is secured to the drive shaft 39 of the hydraulic motor and a sprocket chain 40 extends around this sprocket and around a larger diameter sprocket 41 secured to the lower end of a shaft 42 journalled within a bearing sleeve (not illustrated) within the framework 10. A relatively small sprocket 43 is secured to the upper end of shaft 42 and this small sprocket engages a chain 44 secured to the inner rim 45 of the table 34 and upon the underside thereof as shown in FIGS. 7 and 9.

Sprocket 43 is situated to engage the chain 44 in a position towards the bead breakers so that it can absorb the side thrust of the bead breaker components 13 and 14 which are situated within the framework at opposite ends to the fixed standard 36 as clearly shown in FIGS. 1, 2 and 3.

The sleeve bearing supporting shaft 42 is in the form of a thrust bearing so that this sprocket 43 also absorbs end thrust during the bead breaking functions.

Figure 6:
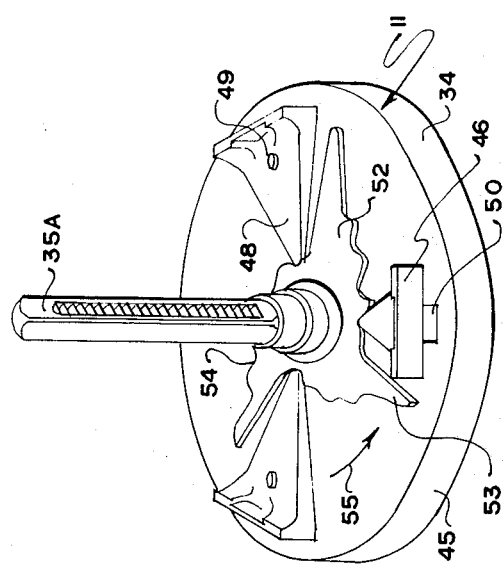
FIG. 6 is an isometric view of the table and upper portion of the standard.
Figure 7:
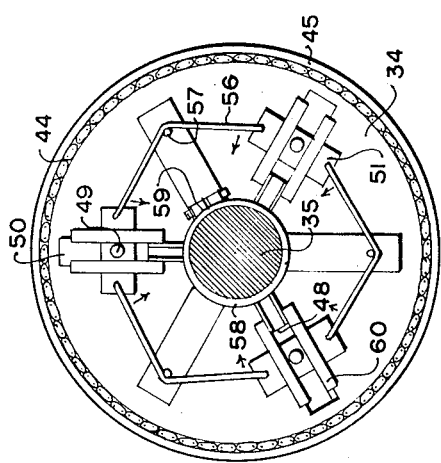
FIG. 7 is an underside view of the table.

Means are provided upon the table 45 to engage the rim of the associated wheel and hold same firmly upon the table both during the bead breaking operations and to cause the wheel and tire to rotate during the tire removal and replacement functions and reference should be made to FIGS. 1, 6 and 7.

A plurality of rim engaging lugs collectively designated 46 are provided, three such lugs being illustrated in the present embodiments. These are situated concentrically upon the table 34 and each lug is substantially triangular when viewed in plan and consists of a rim engaging outer side 47 and a ratchet engaging end 48. Each lug is mounted upon a bolt 49 passing through a slot 50 within the surface of the table and the configuration and arrangement of the lugs is clearly shown in FIGS. 1 and 6.

Upon the underside of the table and secured to bolt 49 is a retaining strap or mounting plate 51 spanning the slot 50 so that each individual lug can be moved inwardly and outwardly within the limits of the slot 50 and can be moved from side to side limited by the side width of slot 50.

A star component 52 freely engages the upper end 35A of the standard 35 and is manually rotatable upon the standard independently of the table 34. This star component includes a ratchet portion 53 for each lug 46 and the ratchet engaging ends 48 of each lug engage the ratchet teeth 54 as clearly illustrated. The shape of the ratchet portions 53 (which are of an increasing diameter) is such that rotation of the star component manually in the direction of arrow 55, forces the lugs 46 outwardly along slots 50, by an equal amount and locks them in the position at which the rotation of the star component ceases.

A bow spring 56 (see FIG. 7) extends around fixed pins 57 and each end of this bow spring is connected to adjacent ends of mounting plates 51 as clearly shown in FIG. 7 and these bow springs normally bias the lugs inwardly towards the center so that the bow springs maintain the lugs within the relevant notches of the ratchet portions 53 once the initial setting has been accomplished manually.

A friction sleeve 58 engages the central standard 35 and the frictional relationship is controlled by means of a spring loaded nut and bolt assembly 59 extending through the ends of the sleeve as shown in FIGS. 3 and 7, and a pair of links 60 are welded by one end thereof to the sleeve 58, there being a pair of links for each lug assembly 46. Each link of a pair extends freely upon each side of the mounting of bolts 49 so that if the sleeve 58 is adjusted correctly, rotation of the table causes the sleeve to drag upon the standard 35 and this rocks the lugs. As the lugs are engaged with the wheel rim due to the initial setting thereof, the beginning of rotation of the rim tries to carry the lugs around but due to the drag of sleeve 58 upon the standard 35, the lug assembly rocks sideways slightly around bolt 49 which is engaged between links 60 and which act as a fulcrum. As the portion 46 of the lugs is laterally extending relative to the wheel rim, the slightest rocking action is all that is required to jam the lugs into engagement with the rim of the wheel and engage it with a self wrapping action which ensures that the wheel rotates with the table 34. This rocking action occurs whether the table is rotated in one direction or the other.

Figure 14:
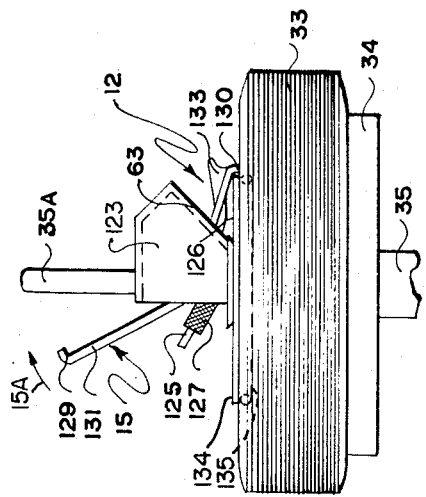
FIG. 14 is a side elevation of a tire and wheel upon the table, with the cone component shown in reverse from FIG. 4 and with a tire engaging tool in position to mount the tire on the rim.
Figure 4:
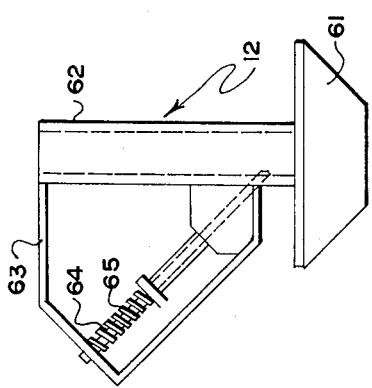
FIG. 4 is a side elevation of the cone component from one side thereof.
Figure 14A:
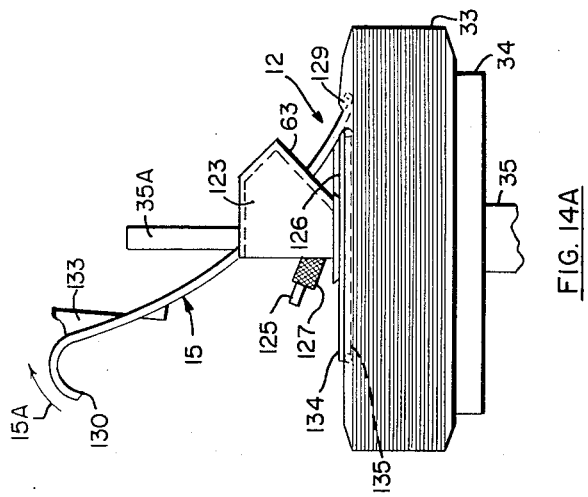
FIG. 14A is a view similar to FIG. 14 but showing the tire engaging tool in the tire demounting position.

Means collectively designated 12 are provided to clamp the wheel into position as hereinbefore described and details of this component are shown in FIGS. 4, 14 and 15.

It takes the form of a cone assembly which includes a truncated conical base 61 surmounted by a square cross sectioned member 62 which freely engages over the upper end 35A of the standard 35, component 62 having a cross sectional aperture to engage the square configuration of the upper end 35A.

A small frame 63 (see FIG. 4 and 14) extends from one side of the component 62 and carries a spring loaded pin 64, the spring 65 normally biassing the pin inwardly. This pin extends through an aperture within the wall of component 62 and engages ratchet serrations 66 formed on one side face of the upper end 35A of the standard, shown in FIGS. 1 and 6.

Figure 8:
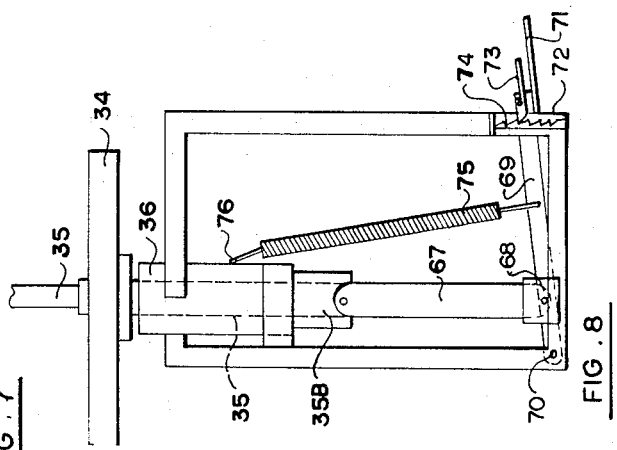
FIG. 8 is a side elevation of the table and the central standard together with means for raising and lowering same.

In operation of this portion, the tire and wheel are mounted upon the table 34 whereupon the star component 52 is rotated to force the lugs 46 into engagement with the rim. The cone assembly 12 is then dropped over the upper end 35A of the standard and the cone engages the central hub of the rim of the tire and wheel assembly with the spring loaded pin 64 preventing upward movement due to the engagement thereof with the ratchet face 66. However, means are required to clamp the cone downwardly upon the wheel in order to prevent relative movement of the wheel upwardly or downwardly during the bead breaking process and this is shown in FIGS. 3 and 8. It will be appreciated that this clamping pressure is sufficient to prevent the vertical movement of the wheel yet not too severe to preclude rotation of the wheel and table 34 around stationery post 35, when required.

A pair of links 67 are pivoted by the upper ends thereof to the lower end 35B of the central standard 35 and the other ends of these links are in turn pivoted to a lug 68 situated intermediate the ends of an actuating lever 69. This actuating lever is pivoted by one end to the frame by means of pivot pin 70 and the other end terminates in a foot pedal 71 exteriorly of the frame 10.

A ratchet bar 72 extends upwardly from the frame and is engageable by a spring loaded ratchet lever 73, the end of which is pivted to the actuating lever 69 adjacent the pedal 71. The spring 74 normally holds the ratchet into engagement with the ratchet bar 72 as clearly shown in FIG. 8.

In operation, downward pressure upon pedal 71 against pressure of return spring 75, which extends between lever 69 and an anchor 76, pulls the standard downwardly through the sleeve 36 with the ratchet 73 engaging the bar 72 and holding same in position until the ratchet lever 73 is released whereupon spring 75 pulls the lever 69 upwardly and moves the central standard upwardly thus freeing the cone assembly 12 from the wheel hub.

Once the wheel and tire assembly has been clamped into position upon the table as hereinbefore described, it is of course necessary to break upper and lower beads before the tire can be removed.

Dealing first with the upper bead breaking assembly 13, this consists of a piston and cylinder assembly (see FIG. 12) in which reference character 77 illustrates a movable cylinder and 78 a fixed piston mounted upon a fixed piston rod 79. The lower end of piston rod 79 is pivotally secured to the base of the framework by means of transverse pivot pin 80 (see FIG. 2). The cylinder 77 is journalled for vertical and rotative movement within a mounting sleeve 81 secured to a vertical channel 82 in turn fastened within the general framework 10.

The piston rod 79 consists of a pair of concentrically located tubes, the inner one of which communicates above piston 78 and the outer one of which communicates below piston 78. By routing hydraulic fluid under pressure as will hereinafter be described with reference to FIG. 17, the cylinder can be moved upwardly or downwardly relative to the stationary piston.

An upper bead breaking carrying arm 82 is mounted within a bearing block 83 secured to the upper end of the cylinder 77 and is adjustable lengthwise within limits by the engagement of a spring loaded pin assembly 83' within any one of a plurality of drillings 84 formed in the side of the arm 82 as clearly shown in FIG. 1.

A bead breaking spoon 85 is pivoted upon pivot pin 86 within the end of arm 82 and may be locked in the bead breaking position by means of a locking lever 87 pivoted upon a pin 88 within the end of the arm 82 and details of this are shown in FIGS. 1 and 11. The end 88' of the locking lever is shaped to engage the corner 89 of the spoon so that when in the position shown in FIG. 11, the spoon is locked in position and prevented from pivoting upon the pin 86. This facilitates the engagement of the spoon between the bead and rim during the upper bead breaking action.

Figure 5A:
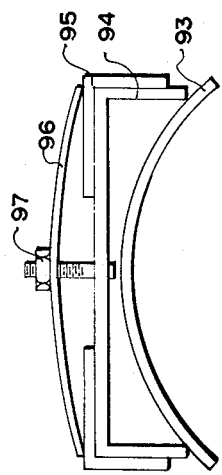
FIG. 5A is a top plan view of FIG. 5 but showing the mounting means.
Figure 5:
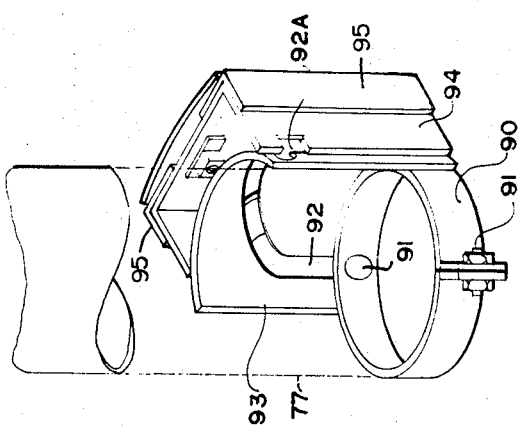
FIG. 5 is an isometric view of the means to swing the upper bead component inwardly and outwardly.

In order to facilitate engagement of the bead breaking spoon 85, means are provided to swing the entire upper bead breaking assembly outwardly and inwardly during the sequence of operations and reference should be made to FIGS. 2 and 5 in this regard.

A friction sleeve 90 surrounds the lower end of cylinder 77 and is adjustably clamped thereto by means of nut and bolt assembly 91' joining the ends of the clamp. A pin or lug 91 extends outwardly from the sleeve 90 and engages an arcuately curved slot 92 formed in a semi-circularly curved plate 93. This slot is closed ended so that it will be appreciated that if the sleeve moves upwardly with regard to the curved plate 93, the arcuately curved slot will cause the sleeve to partially rotate as it reaches the upper end of the slot. As the sleeve is frictionally engaged around the cylinder 77, the cylinder together with the upper bead breaking component will also partially rotate.

A length of channel iron 94 is secured to the back of the curved plate 93 and this in turn is mounted for limited vertical movement within a pair of opposed angle irons 95 secured to the framework and shown in FIG. 2.

A spring tension plate 96 is bolted to the channel iron 94 by means of bolts 97 so that the ends of the spring tension plate register upon the rear surfaces of the angle irons 95 and control the frictional engagement of the channel member 94 within the angle irons, for the aforementioned vertical movement thereof. In operation of this portion of the device, and assuming the cylinder is in the lowermost position with the sleeve 90 in the position shown in FIG. 5, the bead breaking arm at this point is in the position shown in FIG. 1. As the cylinder is moved upwardly by hydraulic fluid, the bead breaking component 13 first moves upwardly as pin 91 moves in slot 92 and is then swung outwardly clear of the table as the pin 91 enters the upper end of slot 92. When it reaches the upper extremity of the slot 92 (indicated in FIG. 5 by reference character 92A), the plate 93 itself is moved upwardly against the friction control of spring plate 96 on the angle irons. This causes the entire bead breaker assembly to move upwardly with the bead breaker still clear of the table.

When the spoon 85 has been moved upwardly sufficiently to clear the tire and wheel assembly, the movement of cylinder 77 is reversed. This causes the pin 91 to start moving downwardly in slot 92 thus swinging the upper bead breaker inwardly to the position shown in FIG. 1.

As pin 91 continues to move downwardly, the bead breaker descends, carrying with it the curved plate 93 if pin 91 reaches the bottom end of the travel. In any event spoon 85 moves vertically into the bead breaking position and engages between the bead of the tire and the rim thus breaking away the bead from the rim. If it is necessary to break the bead at more than one place, reversal of the movement of cylinder 77 will cause the spoon to move upwardly without swinging outwardly providing this movement of cylinder 77 is checked, whereupon the tire can be rotated by table 34 to a new position and the bead breaker lowered once again into engagement therewith.

It will of course be appreciated that the frictional engagement of the channel 94 (carrying plate 93) within the angle irons 95 should be such that the pin 91 will move upwardly and downwardly within slot 92 freely before the curved plate (and channel 94) itself moves vertically, pulled upwardly or downwardly of course by the engagement of pin 91 with the upper or lower ends of slot 92.

In the event that the upper bead breaker spoon 85 jams against either the tire or the wheel, the sleeve 90 acts as an override clutch and rotates upon cylinder 77 without damage occurring to the spoon 85 or to the component engaged thereby inadvertently.

Once the upper bead has been broken, it is then necessary of course to break the lower bead and in this regard, reference should be made to FIG. 2.

The component 14 consists of a substantially right angular member 98 which includes a horizontal portion 99 and a vertical portion 100. This is situated within the framework 10 and is mounted by means of a piston and cylinder assembly 101 which is connected to the source of hydraulic pressure as will hereinafter be described. The cylinder 102 is pivotally mounted adjacent the junction of the portions 99 and 100, by means of a transverse pivot pin 103 extending through gussets 104 clearly shown in FIG. 2.

The piston rod 105 is in turn pivotally mounted to a longitudinally extending girder 106 forming part of the framework, by means of transverse pivot pin 107 and the piston and cylinder assemblies extend in a diagonal direction relative to the component 98.

The distal end 109 of the horizontal portion 99 is supported by means of tension springs 108 extending between the distal end and anchors 110.

The lower bead breaking plate 108A is mounted to the upper end of the vertical portion 100 by means of a transverse pivot pin 109A and the forward or bead engaging edge 110A is arcuately curved as clearly shown and is normally situated with relation to the table, as illustrated in FIG. 1.

Reference to FIG. 10 will show the mounting of the springs 108 upon anchors 110 which are secured to a fixed support tube 111 held within the framework and having a rod or bolt 112 extending therethrough. The upper end of this bolt is provided with adjustment and lock nuts 113 which are screw threadably engageable thereon and register against the upper end of the tube 111.

A heavy duty compression coil spring 114 surrounds the rod within the cylinder 111 and reacts between the upper end thereof and a nut 115 screw threadably engageable upon the lower end as clearly shown in FIG. 10.

A bearing washer 116 is secured adjacent the distal end 109 of the horizontal portion 99 and this washer engages the lower 117 during the operation of the lower bead breaking component.

The operation of the lower bead breaking component is as follows. The tire and wheel assembly are secured to the table as hereinbefore described and the upper bead is broken.

The piston and cylinder assembly 101 is then operated to contract same, it being understood that at the beginning of the sequence, the lower bead breaking plate 108A is in the position shown in FIG. 1.

As the piston and cylinder assembly contracts, the component 98 tries to move diagonally in the direction of the piston and cylinder assembly but tension springs 108 raise the distal end 109 and cause the initial movement of the component 98 to be vertical, it being understood that piston rod 105 is pivoted upon pin 107 so that the piston and cylinder moves in a slight upward arc during this portion of the movement. As soon as the bearing washer 116 engages the lower end 117 of the rod 112, the heavy duty compression spring 114 causes resistance thus causing the component 98 to pivot around pivot pin 103. This moves the bead breaking plate 108A inwardly into engagement between the bead of the tire and the rim, it being understood that the initial vertical movement enabled the front edge 110A to clear the perimeter of the table 34 and to engage the underside of the tire. As soon as the edge does engage between the tire bead and rim, further resistance is encountered to inward movement so that further contraction of the piston and cylinder assembly 101 causes the component 98 once again to move vertically, compressing spring 114. The movement at this particular point is a combination of inward and upward movements depending upon the resistance of the bead and rim, as the edge 110A of the bead breaker plate 108A moves inwardly to break the bead. This action continues until the bead is broken and the movement of component 98 is reversed by reversing the action of the piston and cylinder assembly 101 (see below). In this connection reference should be made to FIG. 13 which shows schematically the automatic cut-off provisions for the bead breaker assembly. A spring loaded pin 118 extends upwardly from the vertical portion 100 of the component 98 and normally maintains the bead breaker plate 108A at a slightly upwardly inclined angle which facilitates the engagement between the bead and the rim during the breaking operation.

As the edge 110A moves towards the rim, it is engaged upon an adjustable stop 119 situated on the end of a yoke 120 secured to control lever 121 of the lower bead breaker shuttle 30. Control lever 121 is pivoted at 122 upon frame 10. Once the bead has broken, the resistance to inward movement of component 98 is removed and this component moves inwardly slightly thus causing a chaming action between plate 108A and stop 119 and forcing stop 119 down together with the yoke 120 which returns the lever 121 to neutral. The plate 108A cannot rise during this action due to the engagement thereof with the tire casing. At this point the operator reverses lever 121 thus reversing the action of piston and cylinder assembly 101 as mentioned above. This reverse the movement of component 98 and returns it to the original position.

Once the upper and lower beads have been broken, it is now necessary to remove the tire and in this connection reference should be made to the cone assembly 12. A plate 123 is held in spaced and parallel relationship by means of a brace 124 and a further brace (not illustrated). This brace 124 is apertured to receive a screw threaded rod 125 carrying a plate 126 upon the inner end thereof, said plate inclining at an angle as clearly shown in FIG. 14.

A knurled nut 127 engages the rod and enables the plate 126 to be moved inwardly and outwardly within limits, the purpose of which will hereinafter be described.

In removing the tire, the tool 15 is utilized which is a combination mounting and demounting tool. It consists of a shank portion 128 having an angulated end 129 formed upon one end thereof and a curved end 130 upon the other. In demounting the tire, the portion 131 of the shank rests upon plate 126 with the angulated end 129 engaging between the bead and rim of the tire and upon the underside of the bead. The angulated end is forced between the rim and made with the hook uppermost. Light pressure by hand on the other end of tool 15 in direction of arrow 15A, maintains the tool in position during the demounting action. Rotation of the wheel by means of the table 34 will cause the angulated end 129 to disengage the bead from the rim thus demounting the tire in one rotation.

When it is desired to install the tire, the tool 15 is reversed so that the portion 132 rests upon plate 126 and the curved end 130 engages between the rim and bead. The curved flange 133 extending upwardly from the shank 128 opposite to the curved end 130, forces the bead downwardly into engagement with the rim thus installing the tire in one complete revolution of the wheel.

If so-called "mag" wheels are being worked upon, it is necessary to protect the material against damage and in this connection I have provided a centrally apertured disc 134 having a perimetrical rubber ring 135 cemented to the underside thereof. This rests upon the rim prior to installation of the cone assembly 12 and prevents damage occurring during the clamping and demounting action.

In mounting a tire on such a wheel, it is necessary to prevent the mounting end 130 from moving or being forced against the rim thus causing damage and in this connection there is provided a lug 136 upon the portion 132 which engages the end 137 of the plate 126, it being understood that the position of this plate is adjusted by means of knurled nut 127 so that the end 130 cannot contact the rim during the installation or mounting procedure.

Although the hydraulic connections are basically conventional, nevertheless FIG. 17 shows them schematically.

A conduit 138 extends between the connection 27 of the hydraulic motor and one end 139 of the shuttle valves 29, 30 and 31 which are connected together for common feed purposes and a corresponding conduit 140 extends from connection 28 of the motor to the opposite end 141 of the shuttle valves, it being understood that these two conduits may act as feed and return lines depending upon the position of the various shuttles.

Conduits 142 and 143 extend between the control shuttle valve 29 and the upper bead breaker piston rod 79 and the position of this shuttle valve 29 is controlled by a control lever 144 pivoted to the supporting framework 10 and shown in FIG. 2, it being understood that the shuttle valve 29 is provided with three positions, namely, neutral, upper bead breaker raising and upper bead breaker lowering.

Conduits 145 and 146 extend between the cylinder 101 of the lower bead breaker and the lower bead breaker control shuttle 30 (controlled by lever 121) and once again this shuttle is capable of three positions similar to those described for shuttle 29.

Finally conduits 147 and 148 extend between the control shuttle 31 and the hydraulic motor 37 for rotation of table 34 and in this connection a further feed or return conduit 151 extends to the hydraulic motor at connection 26. Once again the shuttle 31 permits all three positions, namely, rotation clockwise, rotation anti-clockwise and neutral. The operation of the hydraulic motor is controlled by a rocking foot lever 149 mounted adjacent the base of the frame and is connected to the shuttle by means of linkage 150 as clearly shown in FIG. 3.

From the foregoing it will be appreciated that full control is available with maximum hydraulic pressure being available for all functions.

To summarize the operation, the wheel and tire are placed upon table 34, the cone element 12 is dropped over the post or standard 35 and pulled downwardly to clamp the tire and wheel in position during the bead breaking operation. The lugs 46 are adjusted initially to engage the inside rim of the wheel thus ensuring rotation of the wheel by the table 34 during the tire removal and replacement operations.

The upper and lower beads are then broken by the bead breakers 13 and 14 and in this connection the wheel and tire are not rotating but are moved around in increments as the beads are broken. Normally the beads will break if pressure is applied in one place and then at approximately 180° therefrom.

The cone element 12 may then be released slightly to prevent easy rotation of the wheel and tire upon table 34. The end 129 of tool 15 is then hooked under the upper bead between the bead and rim and engaged with the assembly 12 whereupon the cable together the wheel and tire are rotated thus removing the bead from the rim.

When replacing the tire, the lower bead is engaged over the rim manually in the usual way and the wheel mounted on table 34 as hereinbefore described. The opposite end 130 of tool 15 is engaged between the bead and the rim with the curved part facing downwardly. The wheel and tire are revolved so that portion 133 engages above the bead thus forcing it down to engagement with the rim.

Various modifications can be made within the scope of the inventive concept which is herein disclosed and/or claimed.

What we claim as our invention is:

1. A bead breaker and tire removal and replacement assembly comprising in combination a supporting framework, a source of fluid pressure associated with said framework, a wheel supporting component on said framework, means to detachably secure the associated wheel to said component for selective rotation of said wheel, an upper bead breaking assembly on said framework operatively connected to said source of fluid pressure, a lower bead breaking assembly on said framework also operatively connected to said source of fluid pressure and means on said framework selectively engageable by a tire removal and tire replacing tool for removing the associated tire from the wheel and replacing the associated tire upon said wheel respectively, said means to detachably secure the associated wheel to said component including a central non-rotatable standard, a table selectively rotatable, said standard passing freely through said table, a cone assembly engageable over said standard and selectively lockable thereto against upward movement, said cone assembly engaging said wheel centrally in the hub area thereof, selectively operable means on said framework for moving said standard and hence said cone assembly into clamping engagement with said wheel, and means on said table frictionally engageable with the rim of the associated wheel for rotating said wheel when said table rotates, said last mentioned means including a plurality of rim engaging luge concentrically mounted on said table, means to vary the effective diameter of said lugs within limits and means to rock said lugs into gripping engagement with said rim when said table is rotated.

2. The device according to claim 1 in which said last mentioned means includes a mounting plate for each of said lugs on the underside of said table, slots in said table, bolt means extending through said slots securing said mounting plate to said lug, a friction clamp sleeve surrounding said standard and a pair of links extending from said friction sleeve for each lug, one upon each side of said bolt means, and means to adjust the frictional engagement of said friction clamp sleeve upon said standard whereby rotation of said table initiates rocking action of said lugs thereby forcing same into contact with said rim.

3. The device according to claim 1 in which said means to vary the effective diameter of said lugs within limits includes spring means normally biassing said lugs to the innermost position, a star component freely engaging said standard upon the upperside of said table, and a ratchet portion extending from said star component for each of said rim engaging lugs, the inner ends of said rim engaging lugs engaging said ratchet portion, rotation of said star component manually forcing said lugs radially outwardly against pressure of said spring means.

4. The device according to claim 2 in which said means to vary the effective diameter of said lugs within limits includes spring means normally biassing said lugs to the innermost position, a star component freely engaging said standard upon the upperside of said table, and a ratchet portion extending from said star component for each of said rim engaging lugs, the inner ends of said rim engaging lugs engaging said ratchet portion, rotation of said star component manually forcing said lugs radially outwardly against pressure of said spring means.

5. A bead braker and tire removal and replacement assembly comprising in combination a supporting framework, a source of fluid pressure associated with said framework, a wheel supporting component on said framework, means to detachably secure the associated wheel to said component for selective rotation of said wheel, an upper bead breaking assembly on said framework operatively connected to said source of fluid pressure, a lower bead breaking assembly on said framework also operatively connected to said source of fluid pressure and means on said framework selectively engageable by a tire removal and tire replacing tool for removing the associated tire from the wheel and replacing the associated tire upon said wheel respectively, said upper bead breaking assembly including a piston and cylinder assembly, said piston being stationary in said cylinder moving vertically relative to said piston, said piston and cylinder assembly being operatively connected to said source of of fluid pressure, an upper bead breaking carrying arm adjustably mounted for horizontal movement within limits, to the upper end of said cylinder, an upper bead breaking spoon pivotally mounted to the inner end of said carrying arm, means to selectively lock said spoon relative to said carrying arm, and means on said framework co-acting with said piston and cylinder assembly whereby upward and downward movement of said cylinder initiates outward and inward swinging of said carrying arm and said spoon.

6. The device according to claim 5 in which said means to detachably secure the associated wheel to said component includes a central non-rotatable standard, a table selectively rotatable, said standard passing freely through said table, a cone assembly engageable over said standard and selectively lockable thereto against upward movement, said cone assembly engaging said wheel centrally in the hub area thereof, selectively operable means on said framework for moving said standard and hence said cone assembly into clamping engagement with said wheel, and means on said table frictionally engageable with the rim of the associated wheel for rotating said wheel when said table rotates.

7. The device according to claim 6 in which said last mentioned means includes a plurality of rim engaging lugs concentrically mounted on said table, means to vary the effective diameter of said lugs within limits and means to rock said lugs into gripping engagement with said rim when said table is rotated.

8. The device according to claim 7 in which said last mentioned means includes a mounting plate for each of said lugs on the underside of said table, slots in said table, bolt means extending through said slots securing said mounting plate to said lug, a friction clamp sleeve surrounding said standard and a pair of links extending from said friction sleeve for each lug, one upon each side of said bolt means, and means to adjust the frictional engagement of said friction clamp sleeve upon said standard whereby rotation of said table initiates rocking action of said lugs thereby forcing same into contact with said rim.

9. The device according to claim 7 in which said means to vary the effective diameter of said lugs within limits includes spring means normally biassing said lugs to the innermost position, a star component freely engaging said standard upon the upperside of said table, and a ratchet portion extending from said star component for each of said rim engaging lugs, the inner ends of said rim engaging lugs engaging said ratchet portion, rotation of said star component manually forcing said lugs radially outwardly against pressure of said spring means.

10. The device according to claim 8 in which said means to vary the effective diameter of said lugs within limits includes spring means normally biassing said lugs to the innermost position, a star component freely engaging said standard upon the upperside of said table, and a ratchet portion extending from said star component for each of said rim engaging lugs, the inner ends of said rim engaging lugs engaging said ratchet portion, rotation of said star component manually forcing said lugs radially outwardly against pressure of said spring means.

11. The device according to claim 5 in which said last mentioned means includes an adjustable friction sleeve surrounding the lower end of said cylinder, a curved plate having an arcuate slot formed therein, means on said sleeve engaging said slot, means mounting said curved plate within said framework, for limited vertical movement therein, and adjustable means co-acting between said curved plate and said means mounting same for adjusting the frictional resistance between said plate and said means mounting same, vertical movement of said cylinder rotating same through the length of said arcuately curved slot, said friction sleeve also acting as overload clutch means between rotation of said cylinder and said arcuate slot.

12. The device according to claim 6 in which said last mentioned means includes an adjustable friction sleeve surrounding the lower end of said cylinder, a curved plate having an arcuate slot formed therein, means on said sleeve engaging said slot, means mounting said curved plate within said framework, for limited vertical movement therein, and adjustable means co-acting between said curved plate and said means mounting same for adjusting the frictional resistance between said plate and said means mounting same, vertical movement of said cylinder rotating same through the length of said arcuately curved slot, said friction sleeve also acting as overload clutch means between rotation of said cylinder and said arcuate slot.

13. The device according to claim 7 in which said last mentioned means includes an adjustable friction sleeve surrounding the lower end of said cylinder, a curved plate having an arcuate slot formed therein, means on said sleeve engaging said slot, means mounting said curved plate within said framework, for limited vertical movement therein, and adjustable means co-acting between said curved plate and said means mounting same for adjusting the frictional resistance between said plate and said means mounting same, vertical movement of said cylinder rotating same through the length of said arcuately curved slot, said friction sleeve also acting as overload clutch means between rotation of said cylinder and said arcuate slot.

14. The device according to claim 8 in which said last mentioned means includes an adjustable friction sleeve surrounding the lower end of said cylinder, a curved plate having an arcuate slot formed therein, means on said sleeve engaging said slot, means mounting said curved plate within said framework, for limited vertical movement therein, and adjustable means co-acting between said curved plate and said means mounting same for adjusting the frictional resistance between said plate and said means mounting same, vertical movement of said cylinder rotating same through the length of said arcuately curved slot, said friction sleeve also acting as overload clutch means between rotation of said cylinder and said arcuate slot.

15. The device according to claim 9 in which said last mentioned means includes an adjustable friction sleeve surrounding the lower end of said cylinder, a curved plate having an arcuate slot formed therein, means on said sleeve engaging said slot, means mounting said curved plate within said framework, for limited vertical movement therein, and adjustable means co-acting between said curved plate and said means mounting same for adjusting the frictional resistance between said plate and said means mounting same, vertical movement of said cylinder rotating same through the length of said arcuately curved slot, said friction sleeve also acting as overload clutch means between rotation of said cylinder and said arcuate slot.

16. The device according to claim 10 in which said last mentioned means includes an adjustable friction sleeve surrounding the lower end of said cylinder, a curved plate having an arcuate slot formed therein, means on said sleeve engaging said slot, means mounting said curved plate within said framework, for limited vertical movement therein, and adjustable means co-acting between said curved plate and said means mounting same for adjusting the frictional resistance between said plate and said means mounting same, vertical movement of said cylinder rotating same through the length of said arcuately curved slot, said friction sleeve also acting as overload clutch means between rotation of said cylinder and said arcuate slot.

17. A bead breaker and tire removal and replacement assembly comprising in combination a supporting framework, a source of fluid pressure associated with said framework, a wheel supporting component on said framework, means to detachably secure the associated wheel to said component for selective rotation of said wheel, an upper bead breaking assembly on said framework operatively connected to said source of fluid pressure, a lower bead breaking assembly on said framework also operatively connected to said source of fluid pressure and means on said framework selectively engageable by a tire removal and tire replacing tool for removing the associated tire from the wheel and replacing the associated tire upon said wheel respectively, said lower bead breaking assembly including an actuating member within said framework, said member including a vertical portion and a horizontal portion, piston and cylinder means extending diagonally between the junction of said portions and said framework, and being operatively connected to said fluid pressure means, a lower bead breaking plate pivotally mounted to the upper end of said vertical portion, and means on said framework cooperating between the distal end of said horizontal portion whereby operation of said piston and cylinder means in one direction initiates substantial vertical movement of said bead breaking plate to clear said table, then inward movement of said bead breaking plate to engage the bead to be broken and then further vertical movement of said bead breaking plate to break said bead, said last two movements being dependent upon the resistance between said bead and said rim, said last mentioned means including tension spring means extending between said distal end of said horizontal portion and said framework normally biasing said end upwardly, and adjustable compression spring means on said framework engageable by said distal end of said horizontal portion after said first vertical movement thereby restricting said vertical movement of said distal end thus causing said actuating member to pivot around the connection of said member to said piston and cylinder means.

18. The device according to claim 17 in which said means to detachably secure the associated wheel to said component includes a central non-rotatable standard, a table selectively rotatable, said standard passing freely through said table, a cone assembly engageable over said standard and selectively lockable thereto against upward movement, said cone assembly engaging said wheel centrally in the hub area thereof, selectively operable means on said framework for moving said standard and hence said cone assembly into clamping engagement with said wheel, and means on said table frictionally engageable with the rim of the associated wheel for rotating said wheel when said table rotates.

19. The device according to claim 18 in which said last mentioned means includes a plurality of rim engaging lugs concentrically mounted on said table, means to vary the effective diameter of said lugs within limits and means to rock said lugs into gripping engagement with said rim when said table is rotated.

20. The device according to claim 19 in which said last mentioned means includes a mounting plate for each of said lugs on the underside of said table, slots in said table, bolt means extending through said slots securing said mounting plate to said lug, a friction clamp sleeve surrounding said standard and a pair of links extending from said friction sleeve for each lug, one upon each side of said bolt means, and means to adjust the frictional engagement of said friction clamp sleeve upon said standard whereby rotation of said table initiates rocking action of said lugs thereby forcing same into contact with said rim.

21. The device according to claim 19 in which said means to vary the effective diameter of said lugs within limits includes spring means normally biassing said lugs to the innermost position, a star component freely engaging said standard upon the upperside of said table, and a ratchet portion extending from said star component for each of said rim engaging lugs, the inner ends of said rim engaging lugs engaging said ratchet portion, rotation of said star component manually forcing said lugs radially outwardly against pressure of said spring means.

22. The device according to claim 20 in which said means to vary the effective diameter of said lugs within limits includes spring means normally biassing said lugs to the innermost position, a star component freely engaging said standard upon the upperside of said table, and a ratchet portion extending from said star component for each of said rim engaging lugs, the inner ends of said rim engaging lugs engaging said ratchet portion, rotation of said star component manually forcing said lugs radially outwardly against pressure of said spring means.

23. The device according to claim 17 in which said upper bead breaking assembly includes a piston and cylinder assembly, said piston being stationary in said cylinder moving vertically relative to said piston, said piston and cylinder assembly being operatively connected to said source of fluid pressure, an upper bead breaking carrying arm adjustably mounted for horizontal movement within limits, to the upper end of said cylinder, an upper bead breaking spoon pivotally mounted to the inner end of said carrying arm, and means on said framework co-acting with said piston and cylinder assembly whereby upward and downward movement of said cylinder initiates outward and inward swinging of said carrying arm and said spoon.

24. The device according to claim 18 in which said upper bead breaking assembly includes a piston and cylinder assembly, said piston being stationary in said cylinder moving vertically relative to said piston, said piston and cylinder assembly being operatively connected to said source of fluid pressure, an upper bead breaking carrying arm adjustably mounted for horizontal movement within limits, to the upper end of said cylinder, an upper bead breaking spoon pivotally mounted to the inner end of said carrying arm, means to selectively lock said spoon relative to said carrying arm, and means on said framework co-acting with said piston and cylinder assembly whereby upward and downward movement of said cylinder initiates outward and inward swinging of said carrying arm and said spoon.

25. The device according to claim 19 in which said upper bead breaking assembly includes a piston and cylinder assembly, said piston being stationary in said cylinder moving vertically relative to said piston, said piston and cylinder assembly being operatively connected to said source of fluid pressure, an upper bead breaking carrying arm adjustably mounted for horizontal movement within limits, to the upper end of said cylinder, an upper bead breaking spoon pivotally mounted to the inner end of said carrying arm, means to selectively lock said spoon relative to said carrying arm, and means on said framework co-acting with said piston and cylinder assembly whereby upward and downward movement of said cylinder initiates outward and inward swinging of said carrying arm and said spoon.

26. The device according to claim 20 in which said upper bead breaking assembly includes a piston and cylinder assembly, said piston being stationary in said cylinder moving vertically relative to said piston, said piston and cylinder assembly being operatively connected to said source of fluid pressure, an upper bead breaking carrying arm adjustably mounted for horizontal movement within limits, to the upper end of said cylinder, an upper bead breaking spoon pivotally mounted to the inner end of said carrying arm, means to selectively lock said spoon relative to said carrying arm, and means on said framework co-acting with said piston and cylinder assembly whereby upward and downward movement of said cylinder initiates outward and inward swinging of said carrying arm and said spoon.

27. The device according to claim 21 in which said upper bead breaking assembly includes a piston and cylinder assembly, said piston being stationary in said cylinder moving vertically relative to said piston, said piston and cylinder assembly being operatively connected to said source of fluid pressure, an upper bead breaking carrying arm adjustably mounted for horizontal movement within limits, to the upper end of said cylinder, an upper bead breaking spoon pivotally mounted to the inner end of said carrying arm, means to selectively lock said spoon relative to said carrying arm, and means on said framework co-acting with said piston and cylinder assembly whereby upward and downward movement of said cylinder initiates outward and inward swinging of said carrying arm and said spoon.

28. The device according to claim 22 in which said upper bead breaking assembly includes a piston and cylinder assembly, said piston being stationary in said cylinder moving vertically relative to said piston, said piston and cylinder assembly being operatively connected to said source of fluid pressure, an upper bead breaking carrying arm adjustably mounted for horizontal movement within limits, to the upper end of said cylinder, an upper bead breaking spoon pivotally mounted to the inner end of said carrying arm, means to selectively lock said spoon relative to said carrying arm, and means on said framework co-acting with said piston and cylinder assembly whereby upward and downward movement of said cylinder initiates outward and inward swinging of said carrying arm and said spoon.

29. The device according to claim 23 in which said last mentioned means includes an adjustable friction sleeve surrounding the lower end of said cylinder, a curved plate having an arcuate slot formed therein, means on said sleeve engaging said slot, means mounting said curved plate within said framework, for limited vertical movement therein, and adjustable means co-acting between said curved plate and said means mounting same for adjusting the frictional resistance between said plate and said means mounting same, vertical movement of said cylinder rotating same through the length of said arcuately curved slot, said friction sleeve also acting as overload clutch means between rotation of said cylinder and said arcuate slot.

30. The device according to claim 24 in which said last mentioned means includes an adjustable friction sleeve surrounding the lower end of said cylinder, a curved plate having an arcuate slot formed therein, means on said sleeve engaging said slot, means mounting said curved plate within said framework, for limited vertical movement therein, and adjustable means co-acting between said curved plate and said means mounting same for adjusting the frictional resistance between said plate and said means mounting same, vertical movement of said cylinder rotating same through the length of said arcuately curved slot, said friction sleeve also acting as overload clutch means between rotation of said cylinder and said arcuate slot.

31. The device according to claim 25 in which said last mentioned means includes an adjustable friction sleeve surrounding the lower end of said cylinder, a curved plate having an arcuate slot formed therein, means on said sleeve engaging said slot, means mounting said curved plate within said framework, for limited vertical movement therein, and adjustable means co-acting between said curved plate and said means mounting same for adjusting the frictional resistance between said plate and said means mounting same, vertical movement of said cylinder rotating same through the length of said arcuately curved slot, said friction sleeve also acting as overload clutch means between rotation of said cylinder and said arcuate slot.

32. The device according to claim 26 in which said last mentioned means includes an adjustable friction sleeve surrounding the lower end of said cylinder, a curved plate having an arcuate slot formed therein, means on said sleeve engaging said slot, means mounting said curved plate within said framework, for limited vertical movement therein, and adjustable means co-acting between said curved plate and said means mounting same for adjusting the frictional resistance between said plate and said means mounting same, vertical movement of said cylinder rotating same through the length of said arcuately curved slot, said friction sleeve also acting as overload clutch means between rotation of said cylinder and said arcuate slot.

33. The device according to claim 27 in which said last mentioned means includes an adjustable friction sleeve surrounding the lower end of said cylinder, a curved plate having an arcuate slot formed therein, means on said sleeve engaging said slot, means mounting said curved plate within said framework, for limited vertical movement therein, and adjustable means co-acting between said curved plate and said means mounting same for adjusting the frictional resistance between said plate and said means mounting same, vertical movement of said cylinder rotating same through the length of said arcuately curved slot, said friction sleeve also acting as overload clutch means between rotation of said cylinder and said arcuate slot.

34. The device according to claim 28 in which said last mentioned means includes an adjustable friction sleeve surrounding the lower end of said cylinder, a curved plate having an arcuate slot formed therein, means on said sleeve engaging said slot, means mounting said curved plate within said framework, for limited vertical movement therein, and adjustable means co-acting between said curved plate and said means mounting same for adjusting the frictional resistance between said plate and said means mounting same, vertical movement of said cylinder rotating same through the length of said arcuately curved slot, said friction sleeve also acting as overload clutch means between rotation of said cylinder and said arcuate slot.

* * * * *